(12) United States Patent
Ookura et al.

(10) Patent No.: US 6,285,152 B1
(45) Date of Patent: Sep. 4, 2001

(54) INDUSTRIAL ROBOT

(75) Inventors: Masahiko Ookura; Shigeo Matsushita; Nobuaki Fujii, all of Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/445,397

(22) PCT Filed: Jun. 9, 1998

(86) PCT No.: PCT/JP98/02539
§ 371 Date: Dec. 7, 1999
§ 102(e) Date: Dec. 7, 1999

(87) PCT Pub. No.: WO98/56541
PCT Pub. Date: Dec. 17, 1998

(30) Foreign Application Priority Data

Jun. 9, 1997 (JP) .................................................. 9-168130

(51) Int. Cl.[7] .................................................. B25J 9/18
(52) U.S. Cl. .................................................. 318/568.11; 901/16
(58) Field of Search .................................. 901/8, 14–18, 901/23, 24, 27, 28, 29, 30, 38; 318/568.11; 414/744.2, 744.3, 744.4, 744.5

(56) References Cited

U.S. PATENT DOCUMENTS 5,085,556 * 2/1992 Ohtomi .................................. 901/18
5,087,169 * 2/1992 Tübke .................................... 901/8

* cited by examiner

Primary Examiner—Khanh Dang
(74) Attorney, Agent, or Firm—Armstrong, Westerman, Hattori, McLeland & Naughton, LLP

(57) ABSTRACT

The present invention is an industrial robot which has a feed screw that can be easily position in relation to the direct-acting guide. It has a power transmission device that can be removed from the supporting frame which the feed screw is left attached to the supporting frame, so that positioning of the feed screw is very easy.

As a result if the simplicity in design machining is only required for the attaching surface for the direct-acting guide, the middle plate, the top plate, and the bottom plate, the cost of production is reduced.

2 Claims, 2 Drawing Sheets

INDUSTRIAL ROBOT

TECHNICAL FIELD

The present invention relates to an industrial robot having a direct-acting mechanism.

BACKGROUND ART

A horizontal multi-joint type pelletizing robot shall be described with reference to the drawings. FIG. 2 is a sectional side view showing a prior-art horizontal multi-joint type pelletizing robot, which represents a mechanism of a horizontal or vertical acting shaft of a prior-art industrial robot having a direct-acting mechanism in the horizontal and vertical direction.

The supporting frame 1 has a rectangular parallelepiped box-shaped structure, in which the front face is opened, and which comprises top plate 11, back plate 12, bottom plate 13, two unillustrated side plates, and middle plate 14 whose three sides are fixed to the top plate 11 and both side plates are disposed inside. The upper surface of the top plate 11, the lower surface of the bottom plate 13, and the front surface of the middle plate 14 are machined so as to be parallel or vertical to each other. At the bottom plate 13, fitting hole 15 is machined by being centered on the basis of the machined surface of the middle plate 14.

A direct-acting guide, 2 is fixed at the machined surface of the front surface of the middle plate 14. A power transmission device 4 such as a gear box, which has a convex part 41 precisely processed at the lower surface. The power transmission device 4 is positioned within a horizontal plane by fitting the convex part 41 into the fitting hole 15, and furthermore, positioned so as to be at a predetermined position and have a predetermined posture with respect to the direct-acting guide 2 by adjusting an unillustrated positioning tool, and fixed at the bottom plate 13. A motor, 5 is fixed to the power transmission mechanism 4, and an unillustrated drive shaft of the motor 5 is coupled with the power transmission device 4. A feed screw 6 comprised of a screw body 61, a nut part 62, an upper bearing 63, and a lower bearing 64.

At the lower end part of the screw body 61, an unillustrated spline is formed, which is engaged with an unillustrated gear of the power transmission device 4. The lower bearing 64 is fixed to the power transmission device 4, and the upper bearing 63 is fixed to the machined surface of the upper surface of the top plate 11. The feed screw 6 is parallel to the direct-acting guide 2, and is adjusted and positioned at a predetermined space. An arm supporting slider 7 is slidably supported by the direct-acting guide 2, and fixed to the nut part 62. The arm supporting slider 7 is driven by the motor 5 via the power transmission device 4 and feed screw 6 to vertically move along the direct-acting guide 2.

An arm part 8 is comprised of a first arm 81, second arm 82, and a wrist 83. The first arm 81, second arm 82, and wrist 83 are rotatably attached around respective unillustrated vertical shafts of the arm supporting slider 7, the first arm 81, and the second arm 82, respectively, and driven by an unillustrated motor. At the front end of the wrist 83, an unillustrated hand, etc. is attached, whereby the hand holds articles.

Thus, this horizontal multi-joint type pelletizing robot works to carry articles held by the hand to an optional location and load them following commands by an unillustrated controller.

However, in FIG. 2 when the feed screw 6 is attached to the supporting frame 1, it is difficult to correctly adjust and position the feed screw 6. The feed screw 6 must be positioned on the basis of both the direct-acting guide 2 and power transmission device 4. This problem is described as follows.

For positioning of the feed screw 6, the following procedures are required: (1) the power transmission device 4 is fixed to the bottom plate 13; (2) the lower end part of the screw body 61 is inserted into the power transmission device 4, and the lower bearing 64 is fixed to the power transmission device 4; (3) the upper bearing 63 is temporarily fixed to the power transmission device 4; and (4) on the basis of the attaching position of the lower bearing 64, while measuring the distance and inclination of the feed screw 6 from the direct-acting guide 2, the fixing positions of the nut part 62 and upper bearing 63 are finely adjusted so that a predetermine parallel condition is obtained.

Thus, the simultaneous fine adjustments of the two fixing positions of the nut part 62 and upper bearing 63 on the basis of the attaching position of the lower bearing 64 are troublesome operations and take time.

Also, unless the feed screw 6 is removed, since the power transmission device 4 cannot be removed from the supporting frame 1, in order to replace and fix the power transmission device 4, the feed screw 6 must be removed, and positioning of the feed screw 6 must be performed at each time of replacement.

Furthermore, since the supporting frame 1 needs precise machining for the three surfaces of the top plate 11, bottom plate 13, and middle plate 14, machining man-hours increase, and the cost also increases.

SUMMARY OF THE INVENTION

The object of the invention is, therefore, to provide an industrial robot in which the feed screw can be easily positioned in relation to the direct-acting guide, while having a power transmission device that can be removed from the supporting frame while the feed screw is left attached to the supporting frame.

In order to solve the above problems, a feed screw supporting member is attached to a supporting frame. The feed screw is positioned and fixed to the feed screw supporting member at a predetermined relative position from the direct-acting guide, and a power transmission device is positioned based on the feed screw, and fixed to the screw supporting member. Also, a space is provided between the supporting frame and power transmission device by which, while the feed screw is left attached to the feed screw supporting member, the power transmission device is removed from the feed screw supporting member, and the front end of the feed screw is pulled and removed from the power transmission device provided, whereby the power transmission device can be pulled out from the supporting frame.

DETAILED DESCRIPTION OF THE DRAWINGS

Hereinafter, the embodiment of the invention shall be described with reference to the drawings.

Figure 1:
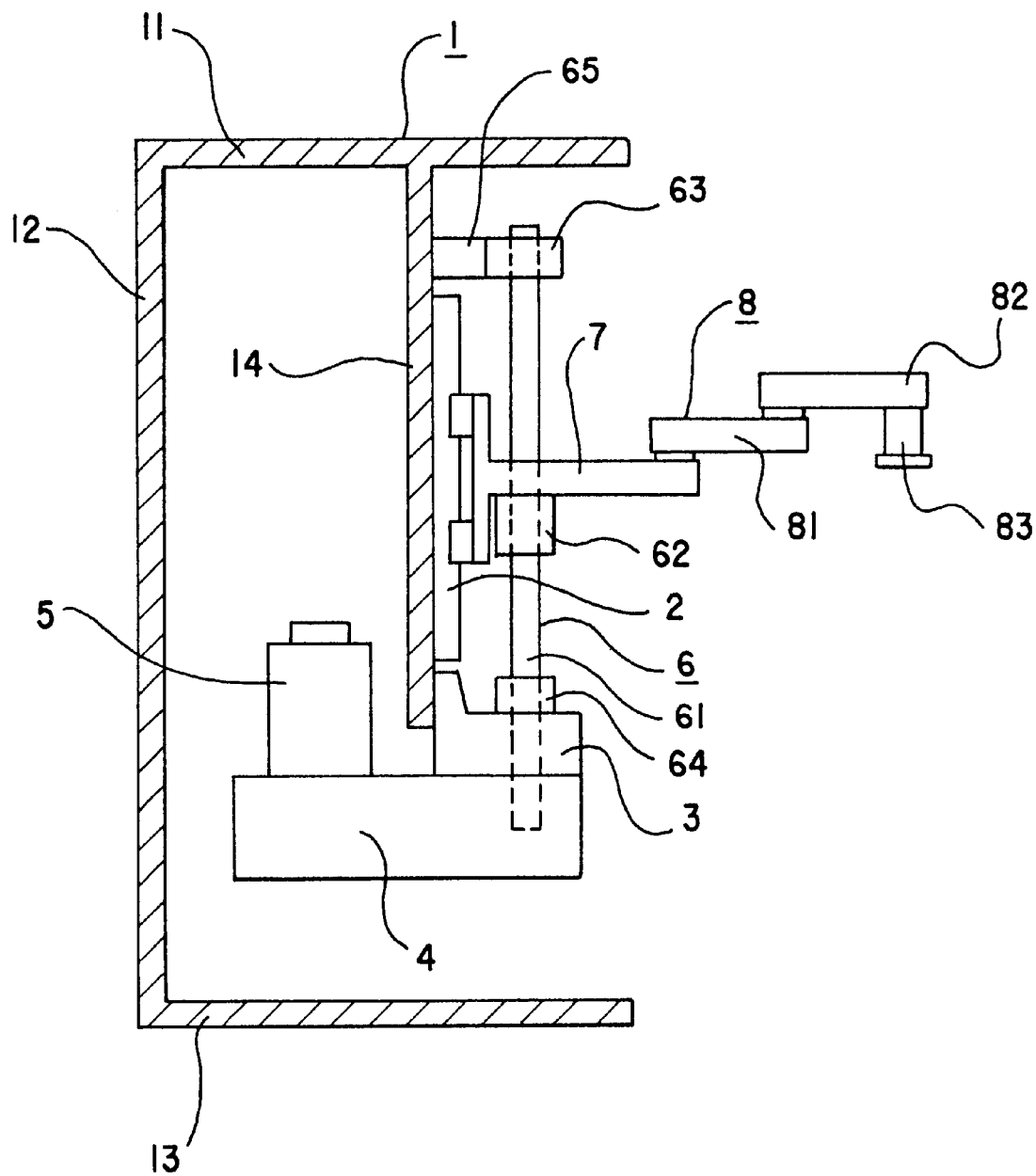
FIG. 1 is the embodiment of the invention.
Figure 2:
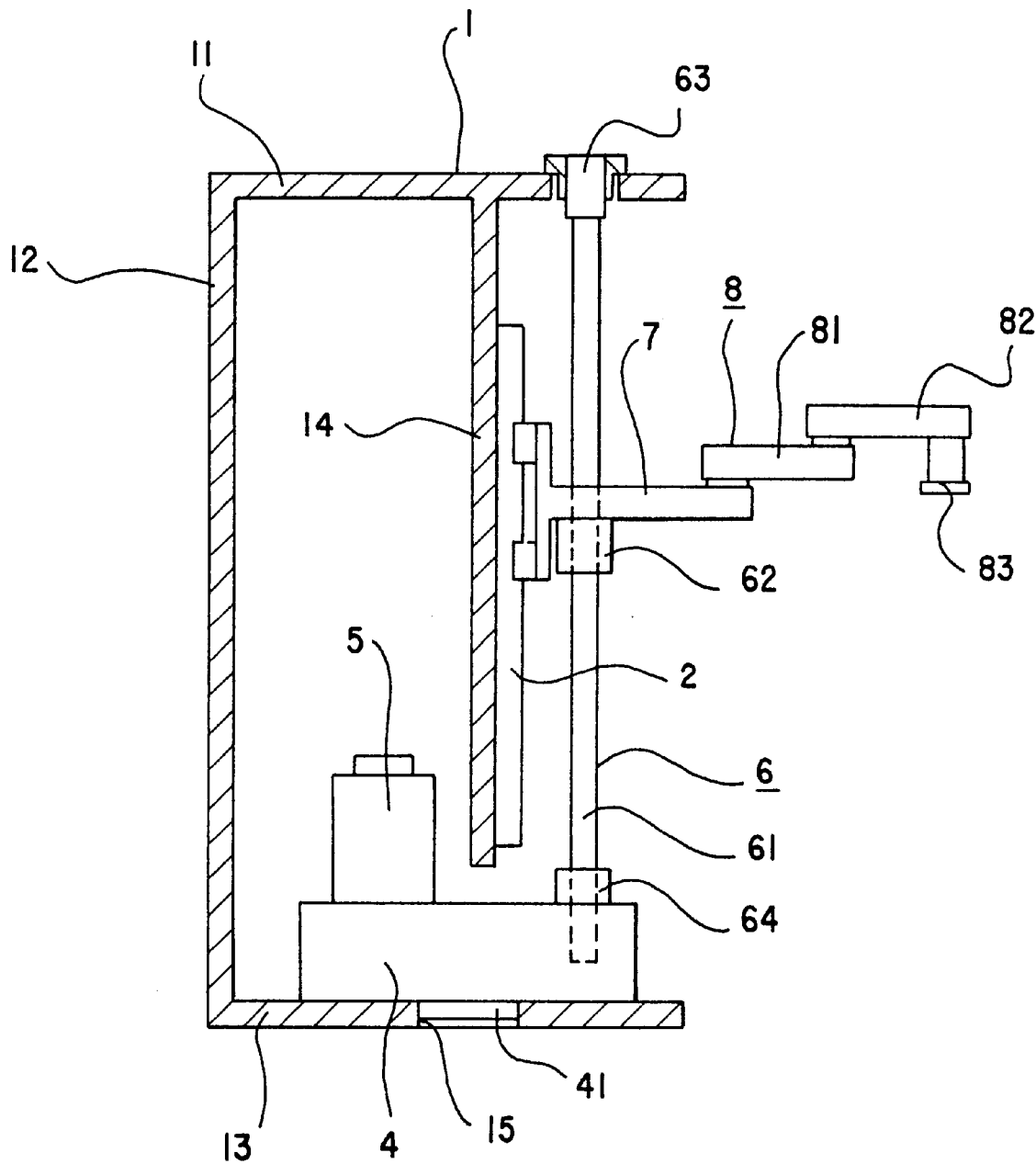
FIG. 2 is Prior Art.

FIG. 1 is a sectional side view of a horizontal multi-joint type pelletizing robot showing a feed screw supporting member 3 fixed to middle plate 14. The feed screw 6 fixes upper bearing 63 to the middle plate 14 via bracket 65, and the lower surface of the lower bearing 64 is received by the upper surface of the feed screw supporting member 3, whereby the lower bearing 64 is fixed and attached to the feed screw supporting member 3.

The lower end part of screw body 61 of the feed screw 6 is inserted into power transmission device 4, and engaged with an unillustrated gear of the power transmission device 4 by an unillustrated spline. The power transmission device 4 is positioned on the basis of the feed screw 6, and fixed to the feed screw supporting member 3. A predetermined space is provided between the power transmission device 4 and the bottom plate 13, whereby the power transmission device 6 can be separated and removed from the feed screw 6 by being moved down to the bottom plate 13 while the feed screw 6 is left fixed to the feed screw supporting member 3.

Also, in the supporting frame 1, the attaching surface for the direct-acting guide 2 of the middle plate 14 must be machined so as to have a predetermined flatness, however, since no part is attached to the top plate 11 and bottom plate 13, they do not need to be machined.

The positioning adjustments of the feed screw 6 can be simplified as follows: (1) the feed screw 6 is inserted into the feed screw supporting member 3 and stood up, and the lower surface of the lower bearing 64 and the upper surface 31 of the feed screw supporting member 3 are put together; (2) the distance between the feed screw 6 and direct-acting guide 2 is measured, the upper bearing 63, nut part 62, and lower bearing 64 are finely adjusted so that the feed screw 6 is at a predetermined position from the direct-acting guide 2; (3) the lower bearing 64 is fixed to the feed screw supporting member 3; (4) the upper bearing 63 is fixed to the middle plate 14; (5) the nut part 62 is fixed to arm supporting slider 7; (6) the power transmission device 4 is inserted from the feed screw supporting member 3, lifted up, and fitted with the feed screw 6; and (7) on the basis of the feed screw 6, the power transmission device 4 is positioned and fixed to the feed screw supporting member 3.

Thus, since the feed screw 6 can be positioned on the basis of the direct-acting guide 2 regardless of the power transmission device 4, positioning of the feed screw 6 is very easy.

Also, the power transmission device 4 is attached by only being fitted with the geed screw 6 whose positioning has been completed.

Also, since the power transmission device 4 can be separated from the feed screw 6 by being disconnected from the feed screw supporting member 3 and moved down to the bottom plate 13, it can be removed while the feed screw 6 is left fixed to the screw supporting member 3.

Furthermore, the machining in the manufacturing of the supporting frame 1 is applied only to the attaching surface for the direct-acting guide 2 of the middle plate 14, and the top plate 11 and bottom plate 13 do not require machining, therefore, machining man-hours and cost can be reduced.

In this embodiment, the direct-acting mechanism in the vertical direction is as described can also be applied to the direct-acting mechanism in the horizontal direction.

As described above, in the invention, an effect can be obtained, that regardless of the power transmission device the positioning adjustments of the feed screw becomes easier since the feed screw can be positioned on the basis of the direct-acting guide. Also, the power transmission device can be removed from the supporting frame while the feed screw is left fixed to the supporting frame because a space is provided between the power transmission device and the bottom plate of the supporting frame.

What is claimed is:

1. An industrial robot which comprises:

a supporting frame;

a direct-acting guide fixed to the supporting frame;

a feed screw, having a nut part, attached to the supporting frame parallel with the direct-acting guide;

an arm supporting slider fixed to the nut part of the feed screw and slidably supported by the direct-acting guide;

a power transmission device;

a motor, fixed to the power transmission device, for driving the feed screw to transmit power between the motor and feed screw; and a feed screw supporting member attached to the supporting frame, the feed screw being positioned at a predetermined relative position from the direct-acting guide and fixed to the feed screw supporting member, with the power transmission device being positioned along a shaft center of the feed screw, and fixed to the surface of the feed screw supporting member opposite the surface with the feed screw attached.

2. An industrial robot as set forth in claim 1, wherein a space is provided between the supporting frame and power transmission device so that, while the feed screw is left attached to the feed screw supporting member, the power transmission device can be removed from the feed screw supporting member and pulled out from the supporting frame.

* * * * *